United States Patent [19]
McKinley

[11] 3,964,204
[45] June 22, 1976

[54] CONTAINER AND DISPENSER FOR FISH BAIT

[76] Inventor: Francis W. McKinley, 1421 W. Colter, Phoenix, Ariz. 85013

[22] Filed: Feb. 27, 1975

[21] Appl. No.: 553,682

[52] U.S. Cl. .......................................... 43/55; 43/4
[51] Int. Cl.² .......................................... A01K 97/04
[58] Field of Search ........... 221/254, 164, 165, 166, 221/167, 266; 222/369; 43/55, 4

[56] References Cited
UNITED STATES PATENTS

| | | | |
|---|---|---|---|
| 2,518,590 | 8/1950 | Andrist | 43/55 X |
| 3,310,200 | 7/1975 | Wood | 221/254 X |

*Primary Examiner*—Stanley H. Tollberg
*Attorney, Agent, or Firm*—Don J. Flickinger

[57] ABSTRACT

An enclosure is provided with an openable cover and has an elongate rotatable shaft extending therethrough. An arm extending radially from the shaft is shaped to engage fish bait within the enclosure and lift the bait through an aperture in the cover in response to rotation of the shaft. A fishhook can be passed through the bait while it is held by the shaped end of the arm.

5 Claims, 8 Drawing Figures

CONTAINER AND DISPENSER FOR FISH BAIT

This invention relates to fishing tackle.

More particularly, the invention concerns a container and dispenser for fish bait.

More particularly, the instant invention concerns a device for holding a quantity of fish bait and for singularly dispensing and holding the bait while a fishhook is passed therethrough.

Certain species of fish are commonly pursued by the method known as "bait fishing". This is a relatively uncomplicated procedure requiring relatively few items of fishing tackle. The bait fisherman practices his avocation quite unencumberedly and rather successfully with only rod, line, hook and bait. Depending upon personal technique, the specific angler may also apply weights, bobbers, snap swivels and other small items. Generally, the activity is well organized and with accessory impedimenta stored in pockets of the clothing or snap-on pouches, the fisherman has both hands free to manipulate the primary tackle. The bait, however, is a perplexity.

Depending on the particular quarry, various types of bait are used. Then, too, one species of fish may be tempted by a variety of baits. For example, salmon eggs, worms and corn are desirable trout bait. Pan fish, such as bluegill, prefer worms, dough balls and certain types of eggs. Other fish respond to specially prepared homemade or commercially available tidbits.

Carrying and dispensing bait disrupts the otherwise well organized routine. The bait must be carried in some type of container which includes a lid to prevent spillage and drying. Opening the cover, retrieving a single piece of bait, and closing the cover generally requires both hands and substantial manipulative effort. Bait containers are generally quite small, making it exceedingly difficult to insert one's fingers to grasp a single item.

Once a single item of bait has been retrieved, other annoyances are encountered. Certain types of eggs are packed in a sticky solution which adheres to the fisherman's fingers. Worms have a rather slimy residue which leaves a rather obnoxious odor on the angler's fingers. In either case, it is desirable to immediately remove the substance to prevent transferring it to the other items of fishing tackle. In addition, the small soft items of bait are difficult to hold. Holding bait while passing a hook therethrough places an additional burden on the young who have not yet developed good coordination, the elderly and others with an unsure grip, and other persons with large fingers.

The foregoing problems are multiplied when it is considered that bait fishermen oftentimes fish from precarious positions, such as standing within the water, balancing upon slippery rocks or other relatively unsafe places in order to gain access to a likely looking pool of water. The entire concern is further compounded and is continually annoying due to the frequency with which fresh bait is put upon the hook. Heretofore, no prior art solution has adequately satisfied the foregoing special needs of the bait fisherman.

Accordingly, it is a principal object of the present invention to provide an improved container for storing and dispensing fish bait.

Another object of the present invention is to provide a container for storing a quantity of fish bait and for singularly dispensing the bait.

Still another object of the present invention is the provision of a fish bait container in which the dispensing means holds the single item of bait while a fishhook is passed therethrough.

Yet another object of the present invention is to provide a fish bait holder and dispenser which will permit the fisherman to bait a hook without touching the bait.

A further object of the present invention is to provide a container of the above type, in which the bait is retrieved therefrom without the necessity of opening the container.

And still a further object of the present invention is the provision of a fish bait container and dispenser of the above type which is especially adapted to hold and dispense a variety of bait.

Briefly, to achieve the desired objectives of the present invention, first provided is an enclosure for holding a quantity of bait, which enclosure includes a pair of spaced end walls, a side wall extending therebetween and an openable cover. Dispensing means within the enclosure responsive to external cranking means engages a single piece of bait and lifts the bait from the enclosure through an aperture in the cover thereof. The bait is held by the dispensing means while a fishhook is passed therethrough.

The foregoing and further and more specific objects and advantages of the present invention will become immediately apparent to those skilled in the art from the following detailed description of the preferred embodiments thereof, taken in conjunction with the drawings, in which.

Figure 1:
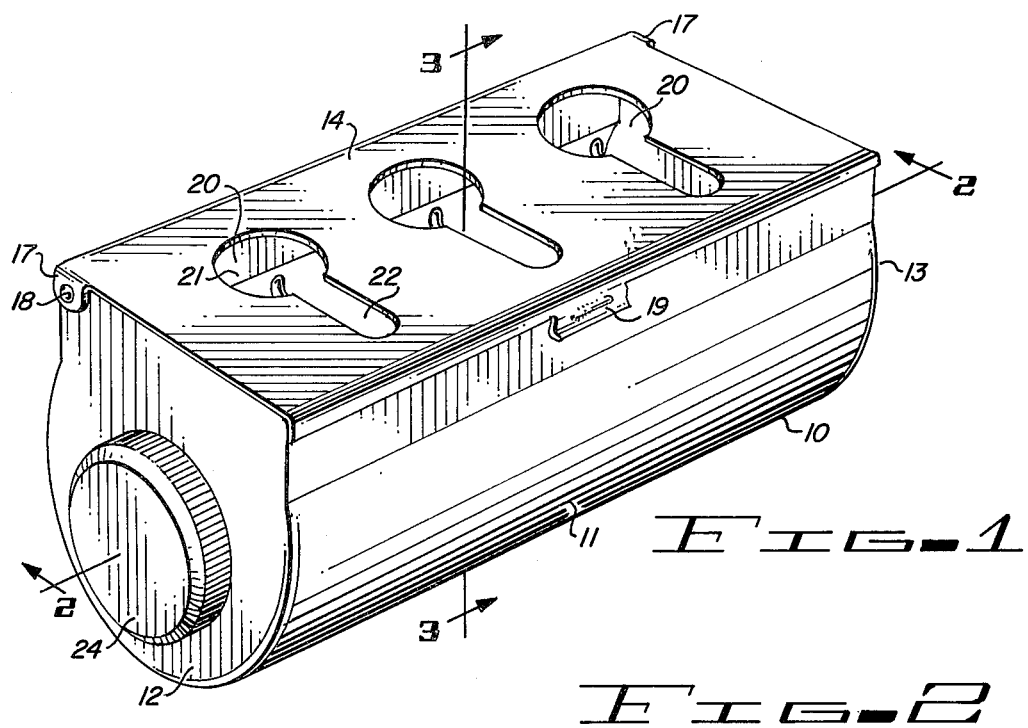
FIG. 1 is a perspective view of a holding and dispensing device for fish bait constructed in accordance with the teachings of the present invention.

Turning now to the drawings, in which the same reference numerals indicate corresponding elements throughout the several views, attention is first directed to FIG. 1 which illustrates a preferred embodiment of a container and dispenser for fish bait having an enclosure 10 formed by an elongate generally arcuate side wall 11 extending between end walls 12 and 13. Enclosure 10 is conventionally fabricated from sheet stock in which the end walls are crimped or bonded to the side wall or molded of a unitary structure either of a metallic or plastic material. Cover 14, as part of enclosure 10, includes downwardly depending tabs 17 which are pivotally secured to end walls 12 and 13 by loosely fitting rivets 18. Cover 14 further includes downwardly depending lip 19 which frictionally engages side wall 11 to selectively retain cover 14 in a closed position. Extending through cover 14 are a plurality of apertures 20, each formed by a circular opening 21 having elongate opening 22 extending therefrom. Elongate opening 22 is transverse to the longitudinal axis of enclosure 10. The utility associated with the particular configuration of apertures 20 will be described presently in further detail.

Figure 2:
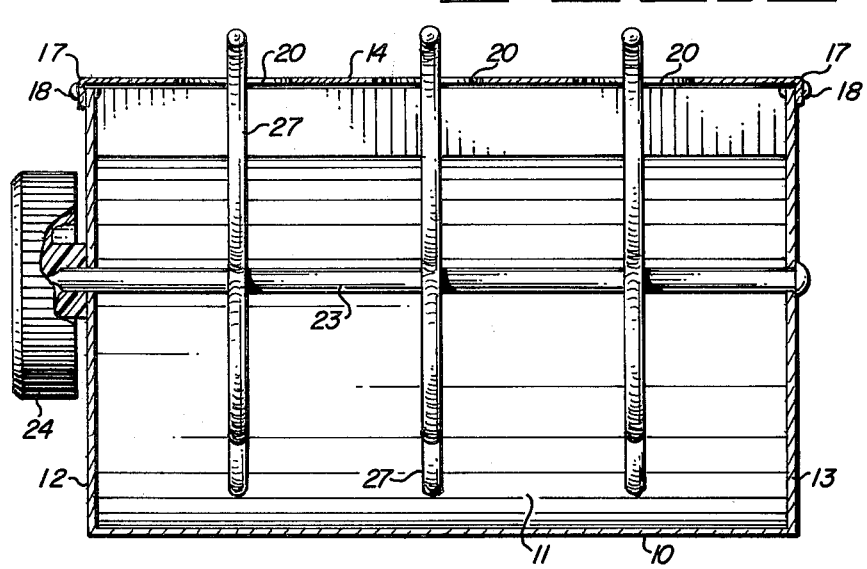
FIG. 2 is a vertical sectional view taken along the line 2—2 of FIG. 1 and specifically illustrating the arrangement of the bait dispensing means therein.
Figure 3:
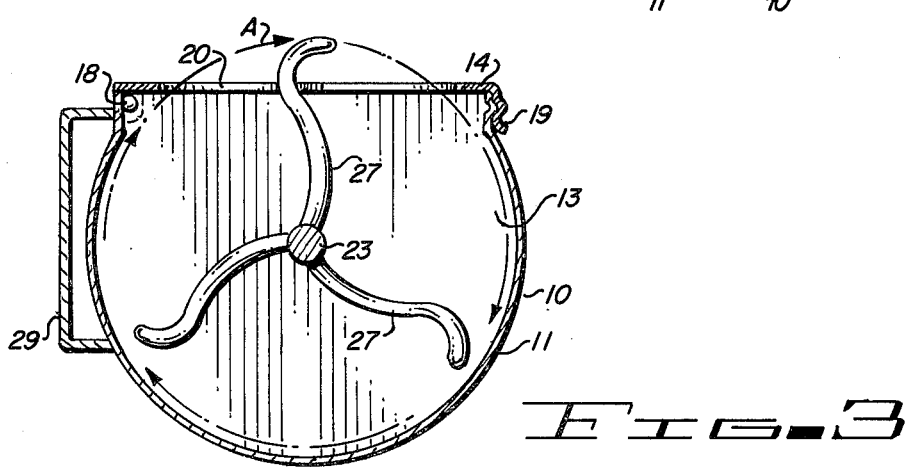
FIG. 3 is a vertical sectional view taken along the line 3—3 of FIG. 2 and further illustrating the bait dispensing means.

As illustrated in FIGS. 2 and 3, an elongate shaft 23 extends longitudinally of enclosure 10 and is rotatably journalled in end walls 12 and 13. Knurled knob 24 provides manual cranking means for rotating shaft 23. A plurality of arms 27 are spaced along shaft 23 and extend radially therefrom. In accordance with the instantly preferred embodiment, arms 27 are arranged in sets of three, each set being equally spaced about shaft 23 and aligned with one aperture 20. Each arm 27 has a hook portion 28 proximate the free end thereof. It is particularly noted that hook portion 28 is arranged to have the open side thereof lead as shaft 23 is rotated to advance arm 27 in the direction of arrow A. With this arrangement, as knob 24 is rotated in the direction of arrow A, it is extended above cover 14 as it passes through circular opening 21 and subsequently passes through elongate opening 22 to return to the interior of enclosure 10.

The fish bait container and dispenser is sized to be carried in an exposed position upon one's body. U-shaped member 29 carried by enclosure 10 provides means for inserting a belt or other strap therethrough for temporary securement to the body. Alternately, the device can be provided with various clip or hook arrangements for fastening to various articles of clothing.

Figure 8:
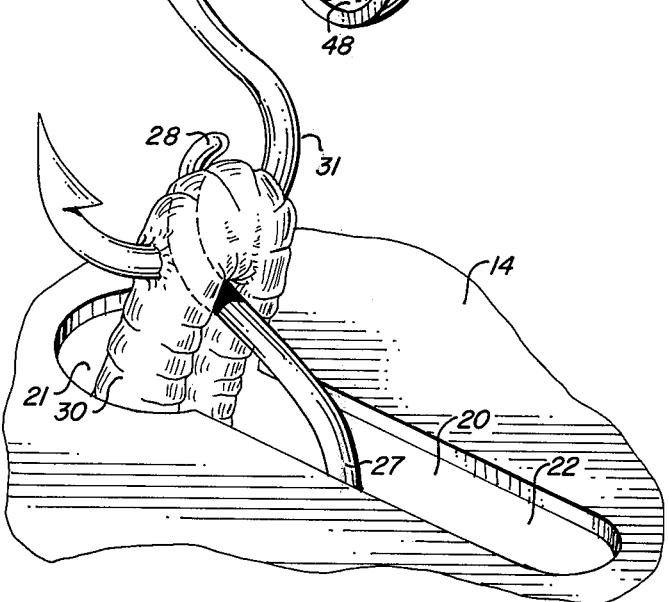
FIG. 8 is an enlarged fragmentary perspective view of the container of FIG. 1 and illustrating in greater detail the dispensing of elongate-type fish bait therefrom.

The above-described preferred embodiment of the present invention is particularly adapted for elongate-type bait, as exemplified by fishing worms. Worms are generally stored in a granular compost-like material which is kept slightly moist. Preferably, enclosure 10 is filled with granular material to a level above shaft 23. The worms, as is common knowledge, will burrow to the lower portion or bottom of the granular material and the enclosure. When the fisherman desires to retrieve a worm, he simply rotates knob 24 in the direction of arrow A. As hooks 28 are passed through the granular material, worms are randomly engaged thereby. As particularly seen in the enlarged fragmentary view of FIG. 8, the singularly engaged worm 30 doubles about hook portion 28. Continued rotation of knob 24 advances arm 27, lifting hook portion 28 and worm 30 through cylindrical opening 21 of aperture 20. While worm 30 is temporarily restrained by hook 28 and closely fitting circular opening 21, hook 31 is passed therethrough. Thus, it is immediately apparent that the entire sequence including retrieving the worm and passing a hook therethrough is accomplished with one hand which serially rotates knob 24 and manipulates hook 31 without the necessity of opening cover 14, inserting the fingers into the enclosure, or making physical contact with the worm.

Figure 4:
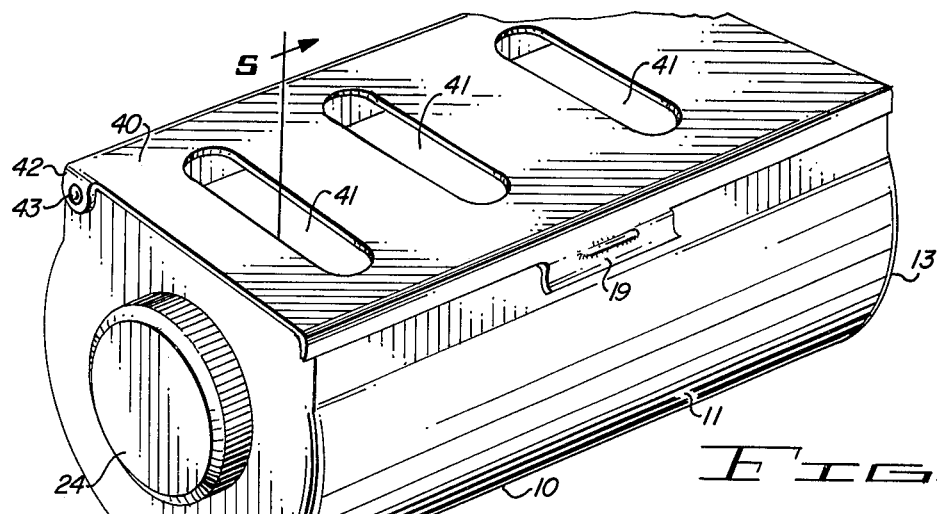
FIG. 4 is a perspective view of an alternately constructed fishing bait holder and dispenser in accordance with the teachings of the present invention.

FIG. 4 illustrates an alternate embodiment of the present invention which is particularly adapted for use with spherical bait, such as salmon eggs. The instant embodiment shares in common the enclosure 10 of FIG. 1 including side wall 11, end walls 12 and 13 and cranking knob 24. An alternate cover 40 having spaced elongate openings 41 therethrough is secured to enclosure 10 by tabs 42 and closely fitting rivets 43, as previously described.

Figure 5:
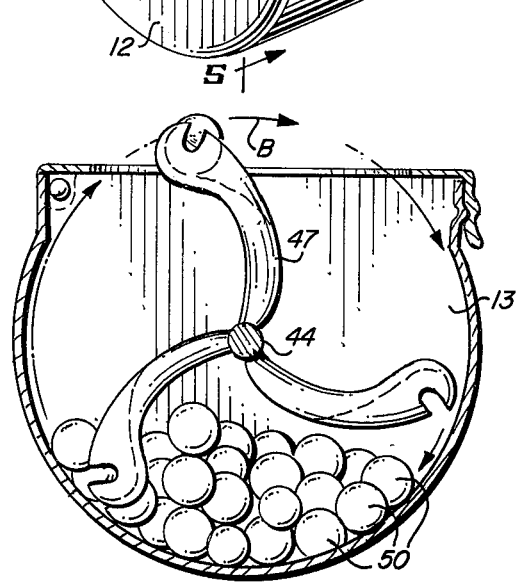
FIG. 5 is a vertical sectional view taken along the line 5—5 of FIG. 4 and specifically illustrating the alternately preferred bait dispensing means associated therewith.
Figure 6:
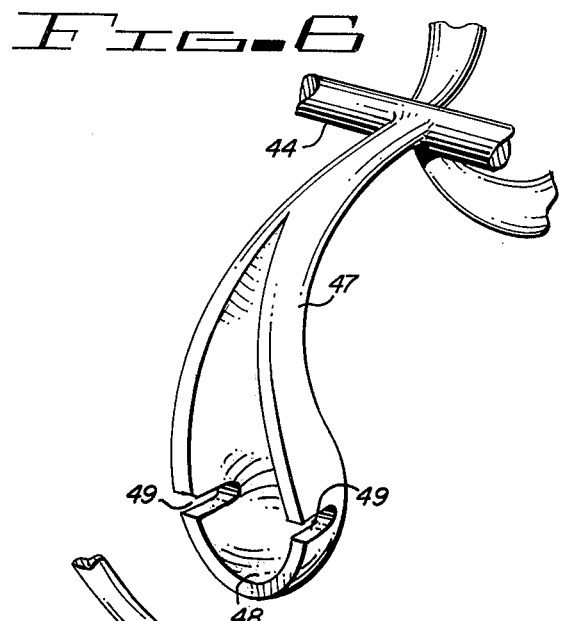
FIG. 6 is an enlarged fragmentary perspective view of a portion of the bait dispensing means of FIG. 5.

Referring to FIG. 5, it is seen that an elongate shaft 44 similar to shaft 23 extends between end walls 12 and 13 and is rotated by knob 24. A plurality of arms 47 are spaced along shaft 44 extending radially therefrom and aligned with openings 41. FIG. 6 affords a better view of the cup 48 associated with the free end of each arm 47. Extending downwardly along opposite sides of cup 48 are elongate apertures 49. Items of spherical bait 50 lie in the bottom of enclosure 10. The term "spherical bait" as used herein applies to salmon eggs, dough balls, corn, or other granular fish attracting tidbits.

Figure 7:
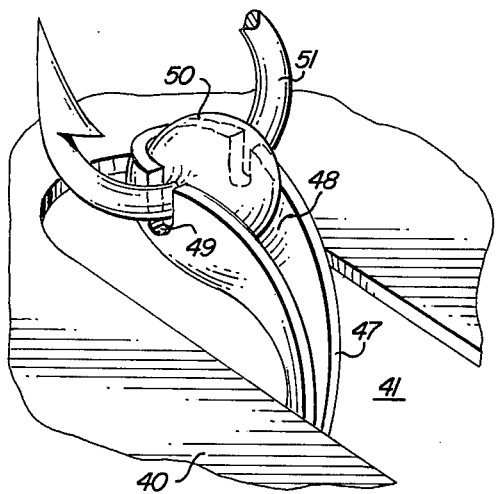
FIG. 7 is an enlarged fragmentary perspective view of a section of the container of FIG. 4 particularly showing how spherical-type fish bait is dispensed therefrom.

Rotation of knob 24 in the direction of arrow B passes arms 47 through granular bait 50 whereby a single item thereof is lodged within cup 48. Continued rotation of knob 24, as particularly seen in FIG. 7, lifts the singular item of spherical bait 50 through opening 41 to a position above cover 40. While thus held in cup 48, fishhook 51 is passed through the item of bait 50. Elongate apertures 49 are sized to receive fishhook 51 therethrough for engaging bait 50 proximate the center thereof. In accordance with the primary objects of the invention, spherical bait 50 has been impaled upon hook 51.

Various changes and modifications in the embodiments herein chosen for purposes of illustration will readily occur to those skilled in the art. For example, it is within the scope of the present invention to provide a container having a divider therein to provide two compartments within the enclosure and appropriate modifications to the apertures within the cover and the arms of the rotatable shaft whereby elongate bait may be carried and dispensed from one compartment, while spherical bait is dispensed from the other compartment.

Similarly, each set of arms may be staggered or misaligned from each other set of arms to provide a more random engagement of the bait.

Having fully disclosed and described the present invention and the preferred embodiments thereof in such clear and concise terms as to enable those skilled in the art to understand and practice the same, the invention claimed is:

I claim:

1. A container for storing a quantity of fish bait and for singularly dispensing and holding said bait while a fishhook is passed therethrough, said container comprising:
   a. an enclosure for holding said quantity of bait and including a pair of spaced end walls, an elongate generally arcuate side wall extending between said end walls and an openable cover;
   b. means defining an aperture in said cover;
   c. an elongate shaft extending between said end walls and rotatably journalled therein;
   d. cranking means for rotating said shaft; and
   e. an arm extending radially from said shaft and rotatable therewith and having an end extendable beyond said cover for engaging said bait and lifting said bait through said aperture means.

2. The container of claim 1, further including a cup carried at the free end of said arm for holding spherical bait.

3. The container of claim 2, further including means defining a pair of elongate apertures extending downwardly along opposite sides of said cup and sized to receive a fishhook therethrough for impaling said spherical bait.

4. The container of claim 1, further including hook means carried proximate the free end of said arm for engaging elongate bait thereby forming a doubled length thereof and for lifting said elongate bait and projecting said doubled length through said aperture means.

5. The container of claim 4, wherein said aperture means are sized and shaped to closely receive said hook means and said doubled bait therethrough for holding said elongate bait while a fishhook is passed therethrough.

* * * * *